United States Patent
Okuyama et al.

(10) Patent No.: US 7,368,187 B2
(45) Date of Patent: May 6, 2008

(54) THERMALLY STABLE LOW NOISE MAGNETIC RECORDING MEDIA

(75) Inventors: Chiaki Okuyama, Kawasaki (JP); Akira Kikuchi, Higashine (JP); Takashi Gouke, Higashine (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 10/975,282

(22) Filed: Oct. 28, 2004

(65) Prior Publication Data

US 2005/0069734 A1   Mar. 31, 2005

Related U.S. Application Data

(62) Division of application No. 10/186,207, filed on Jun. 27, 2002, now Pat. No. 6,830,807.

(30) Foreign Application Priority Data

Jun. 29, 2001   (JP) .............................. 2001-198538
Apr. 23, 2002   (JP) .............................. 2002-121273

(51) Int. Cl.
*G11B 5/66* (2006.01)

(52) U.S. Cl. .................................................. 428/836.1

(58) Field of Classification Search ...................... None
See application file for complete search history.

(56) References Cited

U.S. PATENT DOCUMENTS

| | | | |
|---|---|---|---|
| 5,523,173 A * | 6/1996 | Doerner et al. ............. | 428/611 |
| 5,736,262 A | 4/1998 | Ohkijima et al. | |
| 5,843,589 A | 12/1998 | Hoshiya et al. | |
| 6,033,772 A | 3/2000 | Lo et al. | |
| 6,383,667 B1 | 5/2002 | Futamoto et al. | |
| 6,440,589 B1 * | 8/2002 | Fullerton et al. ........... | 428/826 |
| 6,830,807 B2 | 12/2004 | Okuyama et al. | |
| 2002/0068199 A1 | 6/2002 | Futamoto et al. | |

FOREIGN PATENT DOCUMENTS

| | | |
|---|---|---|
| EP | 1 271 482 | 1/2003 |
| JP | 60-239916 | 11/1985 |
| JP | 10-261520 | 9/1998 |
| JP | 2000-099934 | 4/2000 |
| JP | 2000-251237 | 9/2000 |
| JP | 2001-034926 | 2/2001 |

OTHER PUBLICATIONS

S. Ohkijima et al., "Effect of CoCr Interlayer on Longitudinal Recording," *Digests of IEEE-Inter-Mag.*, AB-03, 1997.

* cited by examiner

*Primary Examiner*—Holly Rickman
(74) *Attorney, Agent, or Firm*—Greer, Burns & Crain, Ltd.

(57) ABSTRACT

A magnetic recording medium which is thermally stable and produces low media noise. By providing a plurality of intermediate layers made of a CoCr alloy of which saturation magnetic flux densities are controlled within a predetermined range, the magnetic recording medium simultaneously realizes both a high S/Nm and thermal stability.

3 Claims, 13 Drawing Sheets

THERMALLY STABLE LOW NOISE MAGNETIC RECORDING MEDIA

This is a Divisional of parent application Ser. No. 10/186,207, filed Jun. 27, 2002, now U.S. Pat. No. 6,830,807 and related to application Ser. No 10/838,832, filed May 4, 2004, which is a continuation-in-part of the same parent Application.

BACKGROUND OF THE INVENTION

1. Field of the Invention

The present invention generally relates to a magnetic recording medium, and more particularly, to a thermally stable high density magnetic recording medium that makes low noise.

2. Description of the Related Art

Developments in information technology require an increase in recording density of magnetic recording devices used for computer peripheral storage systems. One of the important properties required of magnetic recording media is a high S/Nm ratio (a signal to media noise ratio).

It is known that the pulse width Pw50 of a readback waveform of a general horizontal magnetic recording medium is related to a coercive force Hc, a remanent magnetic flux density Br, and a magnetic layer thickness t as follows:

$$a \propto (t \times Br/Hc)^{1/2}, \text{ and}$$

$$Pw50 = (2 \times (a+d)^2 + (a/2)^2)^{1/2},$$

where d is a magnetic spacing.

The pulse width at 50% amplitude Pw50 is desired to be as small as possible in order to increase the resolution of a readback signal. Accordingly, it is desirable to design a magnetic recording medium having a smaller magnetic layer thickness t and a larger coercive force Hc.

To achieve a reduction in media noise, the size of magnetic grains can be reduced and intergranular magnetic interactions can be weakened. Some methods that make magnetic grains small by adding, for example, tantalum Ta, niobium Nb, boron B, or phosphorus P, to a CoCr-based alloy are proposed.

It is further known that the addition of platinum Pt to a CoCr-based alloy, for example, increases the coercive force Hc of a magnetic layer.

Furthermore, adding Cr to the magnetic layer of a CoCr-based alloy is reported to be effective in reducing intergranular magnetic interactions in the magnetic layer. However, it is known that, if a large quantity of nonmagnetic material is added to a Co-based alloy, the in-plane orientation in the direction of the easy axis of magnetization, the hcp-C axis, is weakened.

It is reported that providing a Co-based alloy intermediate layer having a stronger in-plane orientation between the magnetic layer and an underlayer solves the problem by enhancing the in-plane orientation (as reported by S. Ohkijima et al, Digests of IEEE-Inter-Mag., AB-03, 1997, for example).

The related art in the Japanese laid-open patent application 2000-251237 discloses that the coercive force is improved by adding metal such as Pt to a CoCr-based alloy formed as an intermediate layer.

The conventional magnetic recording medium, however, still has the following two problems.

The first problem relates to an intermediate layer. The intermediate layer exhibits properties of the in-plane orientation being weakened as the quantity of nonmagnetic material increases. Accordingly, the in-plane orientation is enhanced by providing an intermediate layer made of Co-based alloy with a smaller quantity of nonmagnetic material such as Cr, Ta, Nb, B, Mn, Re, and Pt.

If the quantity of nonmagnetic material is reduced, however, a saturation magnetic flux density Bs of the intermediate layer is increased and an interfacial exchange combination between the intermediate layer and the magnetic layer is strengthened. Moreover, the magnetic layer thickness t may be kept relatively thin. A magnetocrystalline anisotropy field Hk is reduced consequently. This decrease in the magnetocrystalline anisotropy field Hk makes the magnetic recording medium thermally unstable. The high saturation magnetic flux density Bs of the intermediate layer increases intergranular interactions among magnetic grains and media noise in the transitional region.

The second problem relates to the magnetic layer. As mentioned previously, one effective approach to the reduction of the media noise is to decrease the size of the magnetic grains in the magnetic layer. However, the reduction of the magnetic grain size results in another problem, the recording destruction due to thermal instability, since the volume of magnetization per bit is also reduced. The thermal instability is controlled by increasing the quantity of Pt in the magnetic layer because the magnetocrystalline anisotropy field Hk is also increased. However, the increase in the Pt density increases the intergranular interaction, and consequently increases the media noise.

The ratio of an isolated pulse signal to a media noise (Siso/Nm) is decreased to a desired level by increasing Cr density. If Pt density is increased instead of the Cr density to increase the magnetocrystalline anisotropy field Hk, the Siso/Nm cannot be decreased enough.

FIG. 1 is a graph of the coercive force Hc of the magnetic layer of $Co_\beta Cr_\alpha Pt_8 B_3$ (($\alpha$=20-25 at %, $\beta$=100−(8+3+$\alpha$)) as a function of the Cr density of the magnetic layer. FIG. 1 shows that the coercive force Hc of the magnetic layer depends on the Cr density in the magnetic layer.

As the Cr density increases, the media noise is reduced. But one may notice from FIG. 1 that the coercive force Hc decreases. The decrease in the coercive force Hc is caused by the decrease in the decrease in the magnetocrystalline anisotropy field Hk. This means that the magnetic recording medium becomes thermally unstable. According to the conventional technique, it is difficult to manufacture magnetic recording medium with low noise and high thermal stability.

SUMMARY OF THE INVENTION

Accordingly, it is a general object of the present invention to provide a novel and useful magnetic recording medium in which one or more of the problems described above are eliminated.

Another and more specific object of the present invention is, first, to provide a magnetic recording medium characterized by an intermediate layer provided between an underlayer and a magnetic layer which realizes both low noise properties and thermal stability, and secondly, to provide a magnetic recording medium characterized by a magnetic layer which realizes both low noise and thermal stability.

In order to achieve at least one of the above objects, a magnetic recording medium according to the present invention, includes a substrate, an underlayer on said substrate, a first intermediate layer on said underlayer, a second intermediate layer on said first intermediate layer, and a magnetic layer on said second intermediate layer, wherein said first intermediate layer is made of a cobalt based alloy containing chromium equal to or greater than about 7 at % and equal to or smaller than about 28 at %, and said second intermediate layer is made of a cobalt based alloy containing chromium equal to or greater than about 29 at % and equal to or smaller than about 45 at %, and said magnetic layer includes a cobalt based alloy.

By providing a plurality of intermediate layers made of a CoCr alloy of which saturation magnetic flux densities are controlled within a predetermined range, the magnetic recording medium realizes a high S/Nm and thermal stability at the same time.

Other objects, features, and advantages of the present invention will become more apparent from the following detailed description when read in conjunction with the accompanying drawings.

DETAILED DESCRIPTION OF THE PREFERRED EMBODIMENTS

The first through third embodiments of the present invention are now described by reference to the figures. The first and second embodiments relate to a magnetic recording medium having a laminated intermediate layer between an underlayer and a magnetic layer. The third embodiment relates to a magnetic recording medium having a magnetic layer including Ag.

Figure 1:
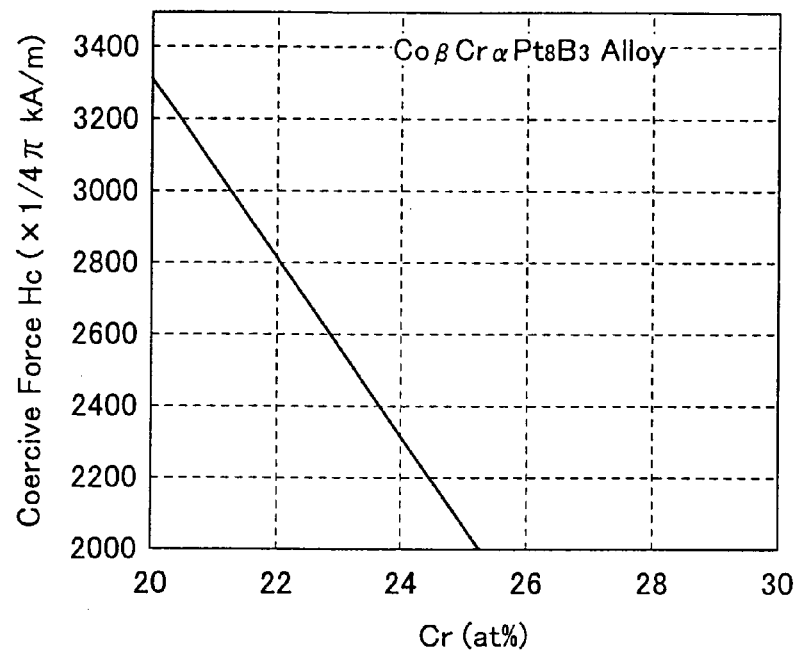
FIG. 1 is a graph of a coercive force Hc as a function of a Cr density, according to the prior art.
Figure 2:
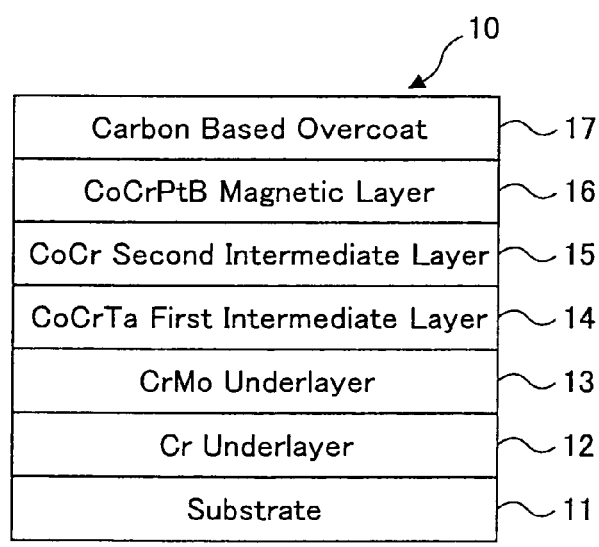
FIG. 2 is a schematic illustration of the lamination structure of a magnetic recording medium according to the first embodiment of the present invention.

FIG. 2 is a schematic illustration of the lamination structure of a magnetic recording medium 10 relative to the first embodiment of the present invention. A substrate 11 shown in FIG. 2 is, for example, a non-magnetic Al substrate which is coated with a NiP film by electroless plating and texture processing. The magnetic recording medium 10 includes, from the bottom in order, an underlayer 12 made of Cr, an underlayer 13 made of CrMo, the first intermediate layer 14 made of Co (Cr, Pt, Ta, B), the second intermediate layer 15 made of CoCr, a magnetic layer 16 made of CoCrPtB, and a carbon-based overcoat 17, laminated on the substrate 11.

The abovementioned expression Co (Cr, Pt, Ta, B) means that the first intermediate layer 14 is made of Co alloy including at least one of Cr, Pt, Ta, and B.

Figure 3:
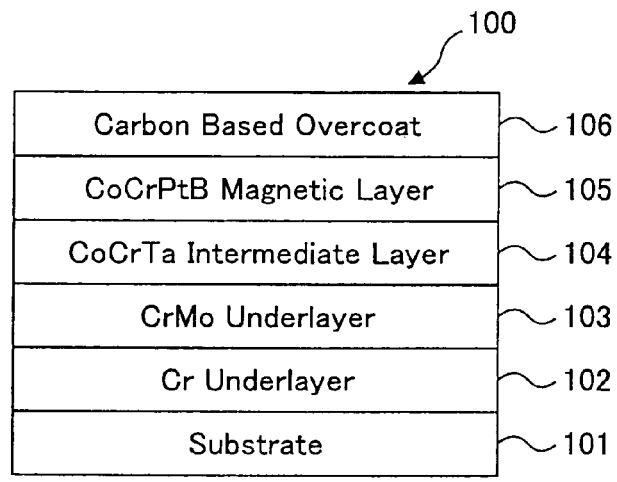
FIG. 3 is a schematic illustration of the lamination structure of a magnetic recording medium which is not an embodiment of the present invention.

FIG. 3 is a schematic illustration of a lamination structure of a magnetic recording medium, as an example for comparison, which is not an embodiment of the present invention. A magnetic recording medium 100 includes, from the bottom in order, an underlayer 102 made of a Cr alloy, an underlayer 103 made of a CrMo alloy, an intermediate layer 104 made of CoCrTa, a magnetic layer 105 made of CoCrPtB, and a carbon-based overcoat 107 laminated on a substrate 101 which is formed similarly to the substrate 11 of the magnetic recording medium 10.

The two magnetic recording media described above differ in that the magnetic recording medium 10 relative to the embodiment of the present invention includes the two intermediate layers 14 and 15, whereas the magnetic recording medium 100 shown as a comparative example includes the only one intermediate layer 104.

A description of the manufacturing process of the magnetic recording medium 10 shown in FIG. 2 is now given for example. The magnetic recording medium 10 is manufactured by laminating each layer in order using the sputtering method. The air in a sputtering chamber is exhausted below $9.0 \times 10^{-5}$ Pa before sputtering the underlayers 12 and 13, and the substrate 11 is heated up to about 210° C. After the heating, Ar gas is injected to maintain the pressure in the chamber at about 0.67 Pa. A 5 nm-thick Cr layer as the first underlayer 12, a 2 nm-thick CrMo layer as the second underlayer 13, a 2 nm-thick CoCrTa layer as the first intermediate layer 14, a 3 nm-thick CoCr layer as the second intermediate layer 15, a 15 nm CoCrPtB layer as the magnetic layer 16, and a 5 nm-thick carbon-based layer as the overcoat 17 are sputtered in order on the NiP—Al substrate in order to manufacture the magnetic recording medium 10.

The magnetic recording medium 100 described as an example for comparison is manufactured in the same manner except for making one intermediate layer 104 instead of two.

The magnetic recording medium 10 will be further described as the preferred embodiment in comparison with the magnetic recording medium 100. It is assumed, in this description of the magnetic recording medium 10, that the first intermediate layer 14 is made of $Co_{80}Cr_{18}Ta_2$ (hereinafter, subscript figures mean percentage of composition) and the second intermediate layer 15 is made of $Co_{58}Cr_{42}$, unless otherwise specified. The single intermediate layer 104 of the magnetic recording medium 100 is made of $Co_{80}Cr_{18}Ta_2$.

Figure 4:
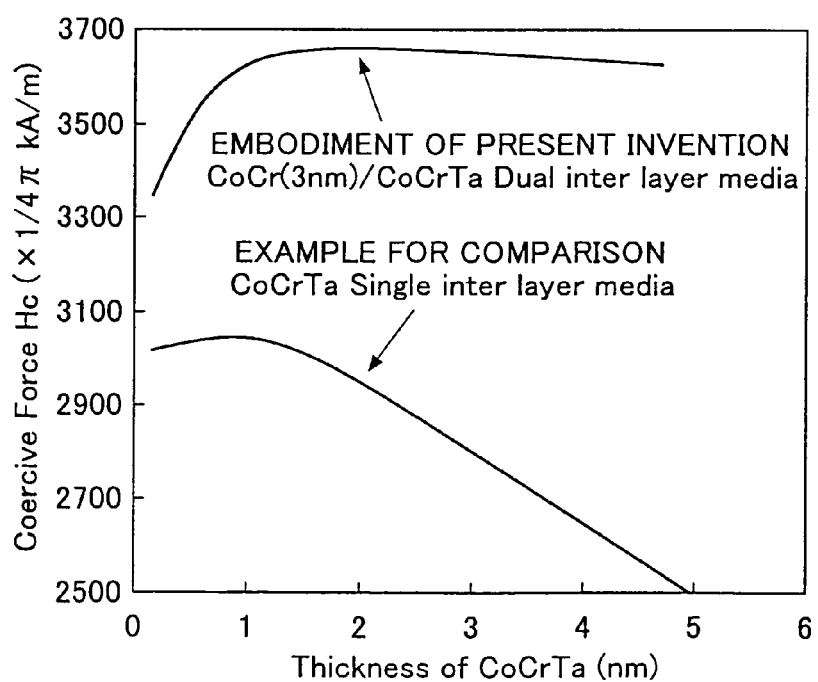
FIG. 4 is a graph of a coercive force Hc, as a function of an intermediate layer thickness, of a magnetic layer of the magnetic recording medium according to the embodiment of the present invention.

FIG. 4 is a graph of a coercive force Hc of the magnetic layer 16 of the magnetic recording medium 10 as a function of a thickness of the intermediate layer. It is obvious from FIG. 4 that the coercive force Hc of the magnetic layer 16 depends on the intermediate layer thickness.

In this measurement of the coercive force Hc of the magnetic recording medium 10, the thickness of the first intermediate layer ($Co_{80}Cr_{18}Ta_2$) is an independent variable, whereas the thickness of the second intermediate layer ($Co_{58}Cr_{42}$) is fixed at 3 nm. To measure the coercive force Hc of the magnetic layer 105 of the magnetic recording medium 100, the thickness of the single intermediate layer 104 ($Co_{80}Cr_{18}Ta_2$) is changed.

For both the magnetic recording media 10 and 100, the product (hereinafter, referred to as "tBr") of the magnetic layer thickness t and a remanent magnetic flux density Br is controlled to be 5.0 nTm.

As shown in FIG. 4, the coercive force Hc of the magnetic recording medium 100 having the single intermediate layer 104 rapidly decreases as the thickness of the single intermediate layer 104 increases beyond 1 nm.

However, the coercive force Hc of the magnetic recording medium 10 having the two intermediate layers 14 and 15 is kept at a high level even if the thickness of the first intermediate layer ($Co_{80}Cr_{18}Ta_2$) is more than 1 nm.

The saturation magnetic flux densities Bs of the 15 nm-thick first intermediate layer ($Co_{80}Cr_{18}Ta_2$) and the 15 nm-thick second intermediate layer ($Co_{58}Cr_{42}$) measured by a Vibrating Sample Magnetometer (VSM) at room temperature are 0.6 T and about 0 T, respectively.

Figure 5:
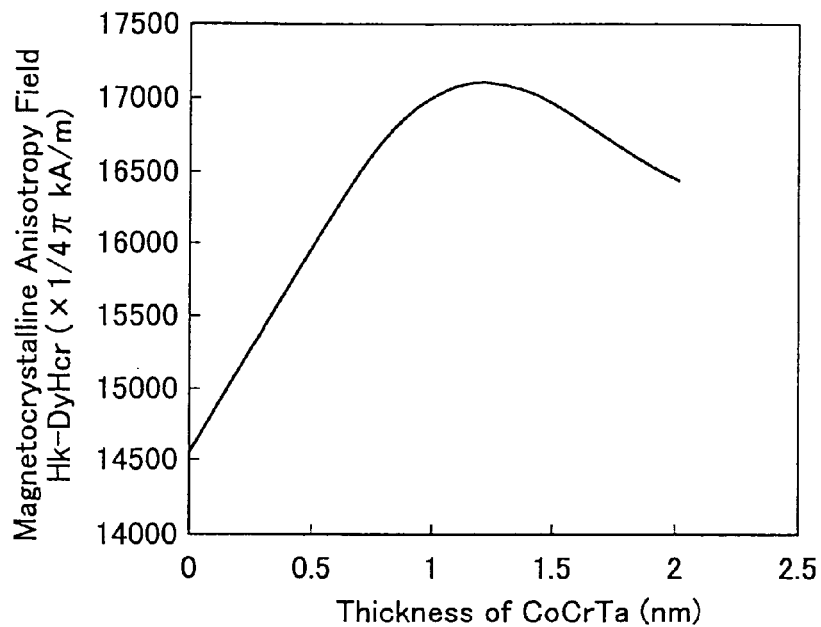
FIG. 5 is a graph of an magnetocrystalline anisotropy field Hk, as a function of the first intermediate layer thickness, of the magnetic layer of the magnetic recording medium according to the first embodiment of the present invention.

FIG. 5 is a graph of a magnetocrystalline anisotropy field Hk of the magnetic layer 16 of the magnetic recording medium 10 as a function of a thickness of the first intermediate layer. It is clear from FIG. 5 that the magnetocrystalline anisotropy field Hk depends on the thickness of the first intermediate layer.

The magnetocrystalline anisotropy field Hk is calculated based on a Dynamic-Hc value measured by the DC-Erase method. The magnetocrystalline anisotropy field Hk is obviously improved as the thickness of the first intermediate layer 14 ($Co_{80}Cr_{18}Ta_2$) of the magnetic recording medium 10 is increased beyond 1 nm.

Figure 6:
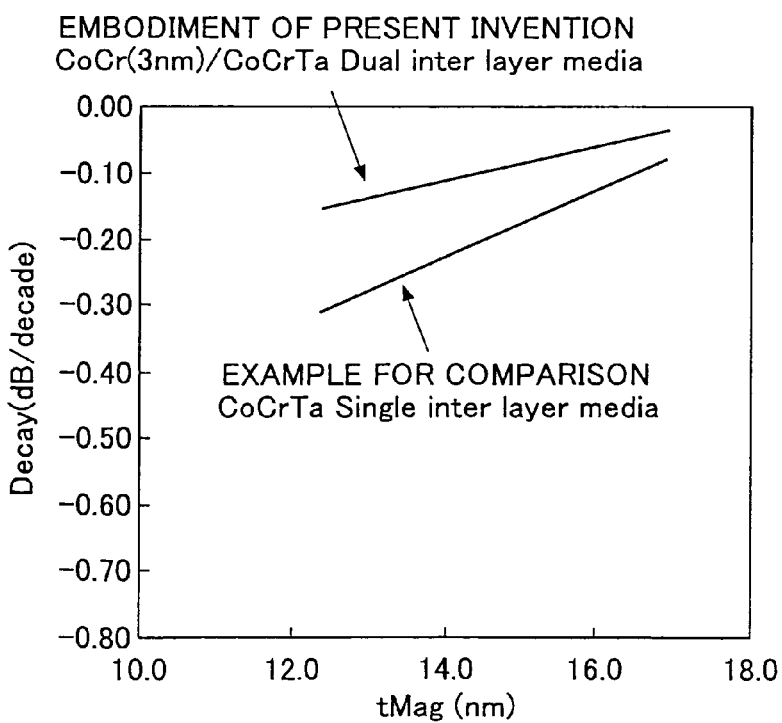
FIG. 6 is a graph of a reproduction signal decay of two magnetic recording media, one an example for comparison and one the first embodiment of the present invention.

FIG. 6 is a graph of the age-based decay of 350 kFCI reproduction signal of both the magnetic recording medium 10 and the magnetic recording medium 100. FIG. 6 shows that the age-based decay of the magnetic recording medium 10 is less than that of the magnetic recording medium 100 since the magnetic recording medium 10 is more thermally stable than the magnetic recording medium 100.

The magnetic recording medium 10 according to the embodiment is thermally stable enough for practical use even if the tBr of the magnetic layer 16 is less than 7.0 nTm. This thermal stability is achieved since a plurality of intermediate layers is provided and the magnetocrystalline anisotropy field Hk is consequently increased.

Figure 7:
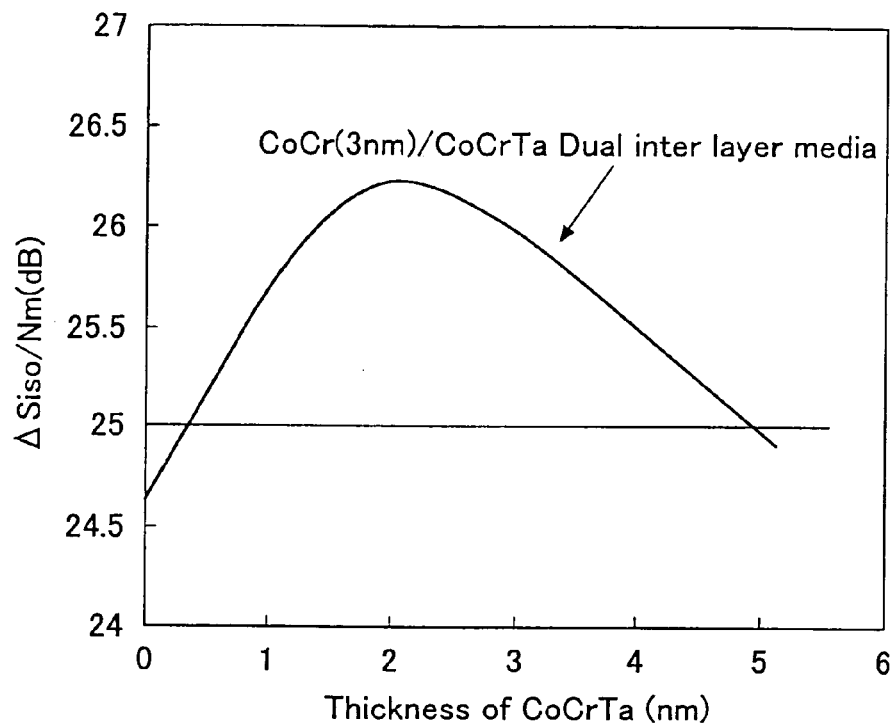
FIG. 7 is a graph of the isolated pulse signal to media noise ratio Siso/Nm, as a function of the first intermediate layer thickness of the magnetic recording medium according to the first embodiment of the present invention.

FIG. 7 is a graph of the isolated pulse signal to media noise ratio (Siso/Nm) of the magnetic recording medium 10, as a function of the thickness of the first intermediate layer 14. It is obvious from FIG. 7 that the Siso/Nm depends on the first layer thickness. If the thickness of the first intermediate layer is set at 1-5 nm, the Siso/Nm exceeds a desired value, 25 dB, for example.

Figure 8:
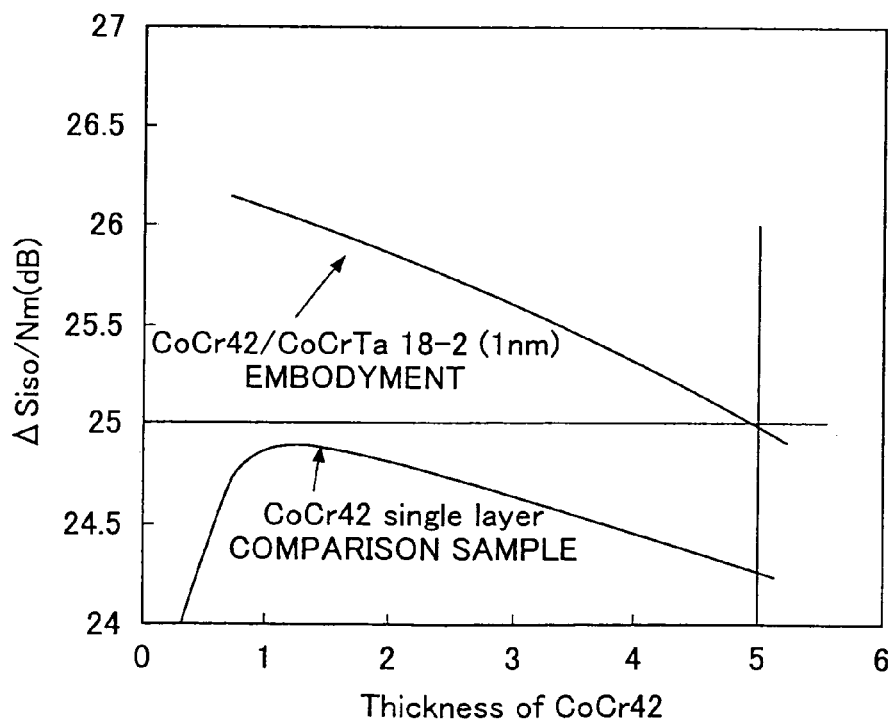
FIG. 8 is a graph of the isolated pulse signal to media noise ratio Siso/Nm, as a function of the second intermediate layer thickness of the magnetic recording medium according to the first embodiment of the present invention.

FIG. 8 is a graph showing the functional relationship between Siso/Nm and the thickness of the second intermediate layer 15 of the magnetic recording medium 10. The thickness of the first intermediate layer 14 is assumed to be 1 nm. The functional relationship between Siso/Nm and the thickness of the intermediate layer 104 of the magnetic recording medium 100 showed in FIG. 3, which is not an embodiment of the present invention, is showed in FIG. 8 for comparison.

One may understand, by reference to FIG. 8, that Siso/Nm decreases as the thickness of the second intermediate layer 15 increases and, when the thickness of the second intermediate layer 15 is 1-5 nm, Siso/Nm exceeds 25 dB, which is desirable.

Figure 9:
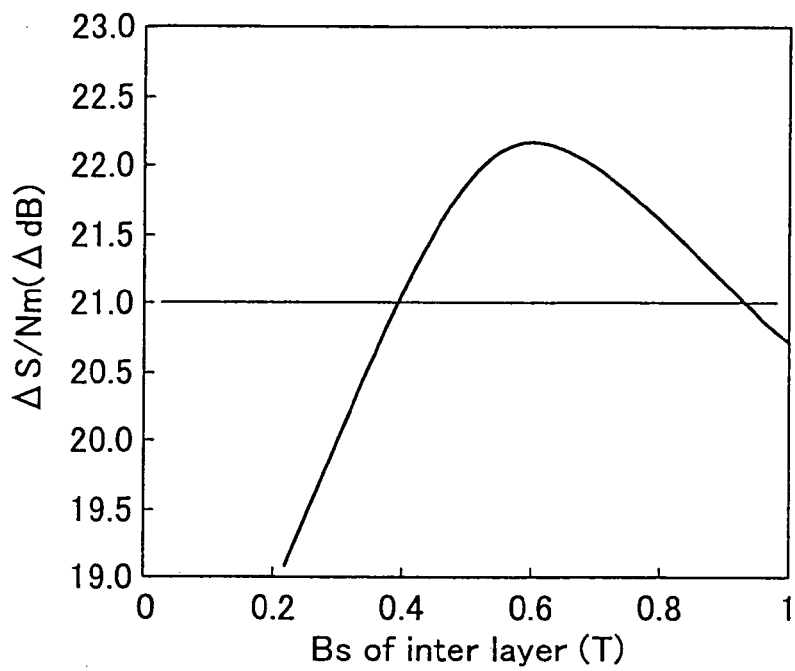
FIG. 9 is a graph of the ratio S/Nm of a reproduction signal to media noise, as a function of the saturation magnetic flux density Bs, of the magnetic recording medium according to the first embodiment of the present invention.

FIG. 9 is a graph of the ratio S/Nm of a reproduction signal to media noise of the magnetic recording medium 10, measured by recording and reproducing data at a speed of 200 kFCI, as a function of a saturation magnetic flux density Bs. The saturation magnetic flux density Bs can be controlled by changing composition of the first intermediate layer 14.

FIG. 9 shows that, in the case wherein a signal of 200 kFCI is recorded to and reproduced from the magnetic recording medium 10, S/Nm depends on the saturation magnetic flux Bs of the first intermediate layer 14. The saturation magnetic flux density Bs of the first intermediate layer 14 was measured with a VSM method at room temperature using a sample in which each intermediate layer material formed a 15 nm-thick single layer on the Cr underlayer.

FIG. 9 further shows that the best S/Nm is obtained at a saturation magnetic flux density Bs of about 0.6 T. If an S/Nm of 21 dB or more is desired, the saturation magnetic flux density Bs of the first intermediate layer needs to be controlled between 0.4 T and 0.9 T.

Figure 10:
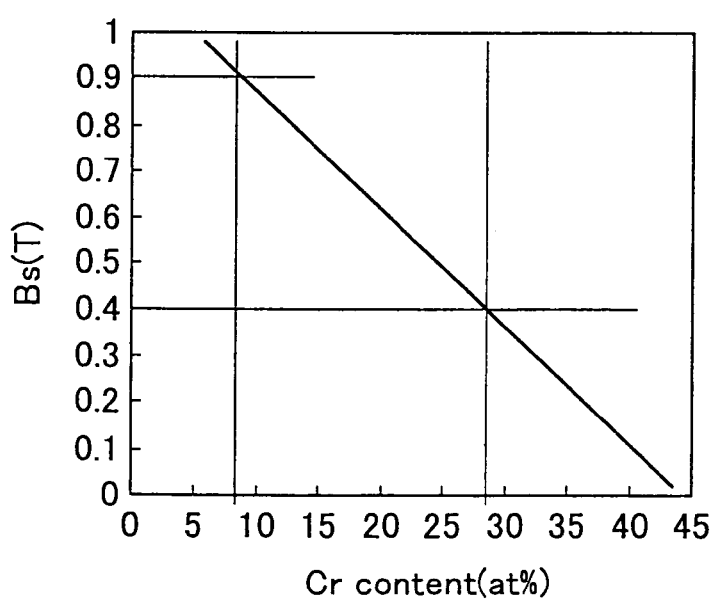
FIG. 10 is a graph of saturation magnetic flux density Bs, as a function of Cr density.

FIG. 10 is a graph of the saturation magnetic flux density Bs as a function of a Cr density in the first intermediate layer 14. FIG. 10 shows that, in the case that the first intermediate layer 14 is made of a CoCr-based dual alloy, if the saturation magnetic flux density Bs is desired to be maintained within a range of 0.4-0.9 T, the Cr density can be controlled within a range of 7-28 at %.

In this embodiment of the magnetic recording medium 10, the second intermediate layer 15 over the first intermediate layer 14 weakens the ferromagnetic interaction (exchange interaction) between the first intermediate layer 14 and the magnetic layer 16. Accordingly, the saturation magnetic flux density Bs of the second intermediate layer is desired to be lower than that of the first intermediate layer. As a result, the second intermediate layer having a saturation magnetic flux density Bs of 0-0.4 T is required to manufacture the magnetic recording medium 10 which satisfies some desirable conditions of magnetic recording media, i.e., a good in-plane orientation, a high magnetocrystalline anisotropy field Hk, a high thermal stability, and a high S/Nm.

In the case that the second intermediate layer is made of a CoCr-based dual alloy, for example, it is known by reference to FIG. 10 that the Cr density is preferably within a range of 29-45 at % to obtain the saturation magnetic flux density Bs of 0-0.4 T.

This first embodiment of the present invention is an example having two intermediate layers 14 and 15, but a magnetic recording medium having three or more intermediate layers is also a variation or a modification of the present invention. It is desired that intermediate layers laid on the first intermediate layer have less saturation magnetic flux density Bs than the first intermediate layer does. A magnetic recording medium having three or more intermediate layers which has a good in-plane orientation, a high magnetocrystalline anisotropy field Hk, a high thermal stability, and a high S/Nm can be manufactured by setting the saturation magnetic flux density Bs of the second intermediate layer or each additional intermediate layer formed after the second intermediate layer at 0-0.4 T.

Figure 11:
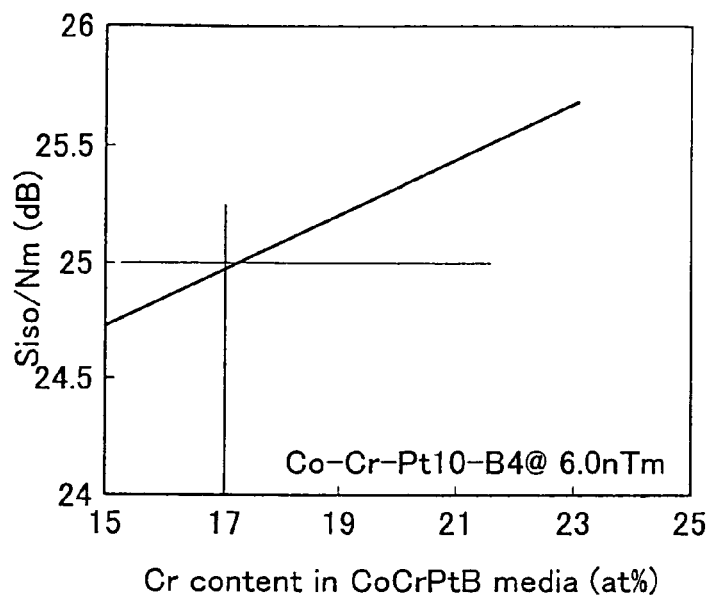
FIG. 11 is a graph of the isolated pulse signal to media noise ratio Siso/Nm, as a function of Cr density, of the magnetic recording medium according to the first embodiment.

FIG. 11 is a graph of the isolated pulse signal to media noise ratio (Siso/Nm) of the magnetic recording medium 10, as a function of the Cr density in the magnetic layer 16. It is obvious from FIG. 11 that the Siso/Nm of the magnetic recording medium 10 depends on the Cr density of the magnetic layer 16.

FIG. 11 shows that the media noise of the magnetic recording medium 10 is reduced as a Cr density in the magnetic layer 16 is increased. A desired Siso/Nm of 25 dB, for example, is obtained on condition that the Cr density of the magnetic layer 16 is 17 at % or more.

Figure 12:
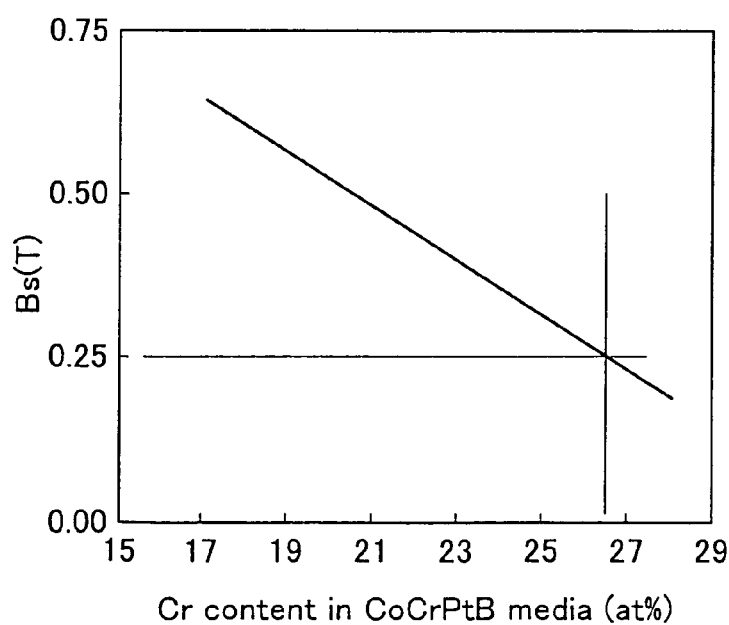
FIG. 12 is a graph of a saturation magnetic flux density Bs, as a function of Cr density, of a magnetic layer of the magnetic recording medium according to the first embodiment.

FIG. 12 is a graph of a saturation magnetic flux density Bs of the magnetic layer 16 as a function of a Cr density in the magnetic layer 16. FIG. 12 shows an obvious dependency of the saturation magnetic flux density Bs on the Cr density. The saturation magnetic flux density Bs drops as the Cr density in the magnetic layer 16 increases. FIG. 12 shows that the Cr density is preferably below 27 at % to obtain a practical saturation magnetic flux density Bs of 0.25 T or more.

Accordingly, the preferable range of the Cr density in the magnetic layer 16 is $17 \leq Cr \leq 27$ at % and more preferably, $20 \leq Cr \leq 26$ at %.

Figure 13:
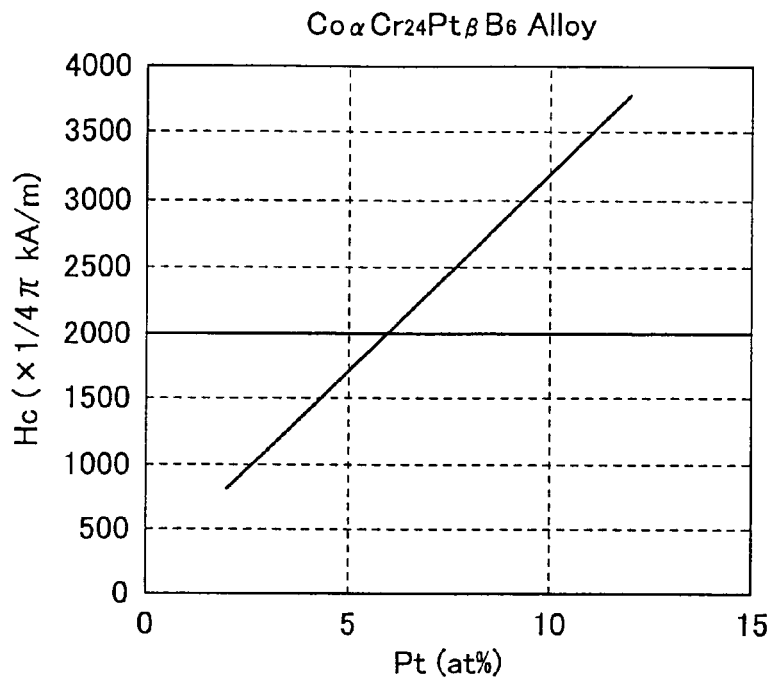
FIG. 13 is a graph of coercive force Hc of a magnetic layer, as a function of Pt density in the magnetic layer, of the first embodiment.

FIG. 13 is a graph of a coercive force Hc of the magnetic layer 16 as a function of a Pt density in the magnetic field. The magnetic layer 16 is made of $Co_\alpha Cr_{24} Pt_\beta B_6$, where $\alpha = (100 - (24 + 6 + \beta))$ (at %). FIG. 13 shows an obvious dependency of the coercive force Hc of the magnetic layer 16 on the Pt density. The coercive force Hc increases linearly as the Pt density increases up to 12 at %.

FIG. 13 shows that, if the coercive force of Hc=2000 (×4/π kA/m) is desired, the Pt density is preferred to be 6 at % or more. On the other hand, the phase diagram (not shown) of a Co—Pt dual alloy indicates that the Pt density of 20 at % or less is required in order to obtain the ECo (hcp) phase. Therefore, the Pt density of the magnetic layer 16 is preferably within a range of $6 \leq Pt \leq 20$ at % to obtain a high coercive force Hc of a ferromagnetic phase.

Figure 14:
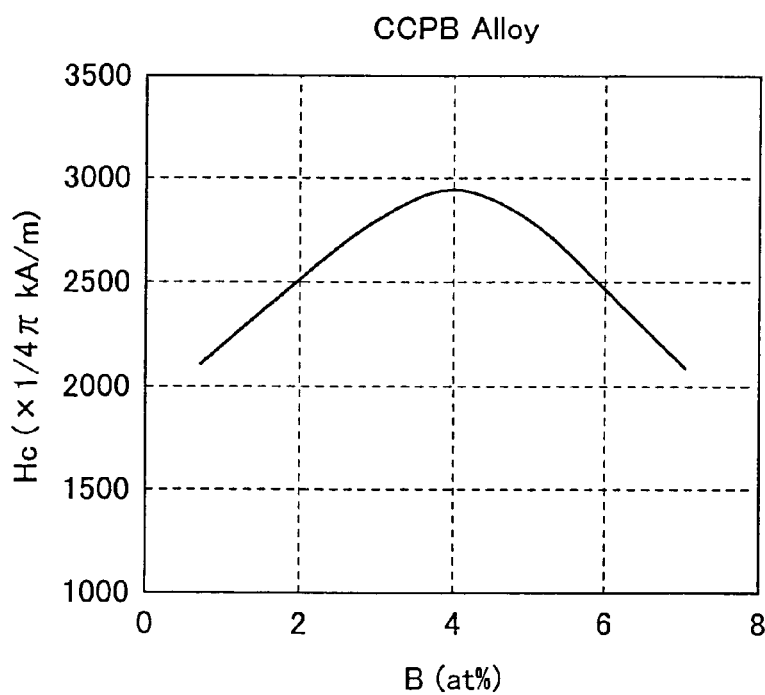
FIG. 14 is a graph of a coercive force Hc of the magnetic layer of a magnetic recording medium according to the first embodiment, as a function of boron B density in the magnetic layer.

FIG. 14 is a graph of the coercive force Hc of the magnetic layer 16 as a function of boron (B) density in the magnetic layer 16. FIG. 14 shows that, if the B density is approximately $1 \leq B \leq 7$ at %, the coercive force Hc of the magnetic layer 16 exceeds 2000 (×4/π kA/m) As a related matter, it is preferable to reduce the misfit between the lattice of the magnetic layer having a relatively high Pt density ($6 \leq Pt \leq 20$ at %) and the lattice of the underlayer made of Cr. To achieve this object, it is advisable to add 1 at % or more of at least one of molybdenum Mo, tantalum Ta, titanium Ti, tungsten W, and vanadium V, to the underlayer, of which the principal element is Cr, of the magnetic recording medium 10 relative to this embodiment. This additional ingredient makes the in-plane orientation stronger.

Figure 15:
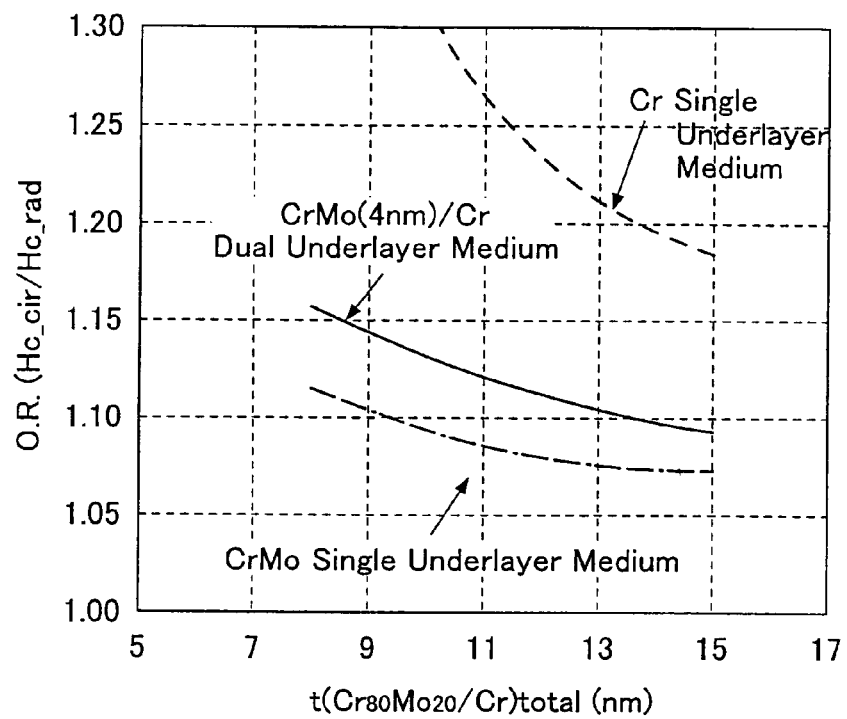
FIG. 15 is a graph of an O.R. as a function of total underlayer thickness.

Further, the magnetic recording medium 10 relative to this embodiment, including a textured substrate 11 laminated with two underlayers 12 and 13, the first Cr-based underlayer and the second CrMo-based underlayer, has a higher orientation ratio (O.R.), the ratio of saturation squareness along the disk circumferential direction to that along the radial direction, as well as strong in-plane orientation. FIG. 15 shows the improvement in the orientation ratio.

FIG. 15 shows how, in the case of the magnetic recording medium 10 according to the embodiment wherein two underlayers are formed by $Cr_{80}Mo_{20}$ (4 nm) and Cr, respectively, the orientation ratio (O.R.) depends on the total thickness of underlayers, compared to the case wherein a single underlayer is formed by Cr and the case wherein a single underlayer is formed by $Cr_{80}Mo_{20}$. The graph shows that, in the case of two underlayers of $Cr_{80}Mo_{20}/Cr$, respectively, the orientation ratio (O.R.) is improved in comparison with the case of one underlayer formed by $Cr_{80}Mo_{20}$. One can confirm by measuring the coercive force Hc in the direction perpendicular to the film and a direction in the plane of the film, that if the bottom underlayer is formed by Cr and the top underlayer is formed by a CrMo alloy, the magnetic recording medium has better in-plane orientation The O.R. is considered to be caused by the difference in the distortion of underlayer lattice between in the circumferential direction and in the radial direction. Actually, since the difference in the underlayer lattice distortion between in the circumferential direction and in the radial direction of a Cr-based alloy is higher than that of a CrMo-based alloy, the O.R. of the Cr-based alloy is higher. The magnetic recording medium 10 relative to this embodiment includes two underlayers, the Cr underlayer 12 on the substrate and the CrMo underlayer 13 on the Cr underlayer, in order to increase both O.R. and in-plane orientation by using the pure Cr underlayer and the CrMo underlayer, respectively. It is confirmed that the S/Nm depends on the temperature of the sputtering chamber, and by conducting the sputtering at the temperature of 170-300° C., a high S/Nm is obtained.

The second embodiment of the present invention will be described next. This second embodiment is a magnetic recording medium having a plurality of intermediate layers related to the first embodiment. In the first embodiment, the second intermediate layer is made of CoCr. The second intermediate layer of this embodiment is made of CoCr-M. This "M" represents at least one element selected out of Mn, Re, and Mo. The structure of the magnetic recording medium according to this embodiment is similar to that of the magnetic recording medium according to the first embodiment showed in FIG. 2. Accordingly, in the description of the magnetic recording medium 30 according to this embodiment, the portion that is equivalent to the portion of the magnetic recording medium in FIG. 2 is referred to by the same numerals and its description will be omitted. What is different will be mainly described below.

Figure 16:
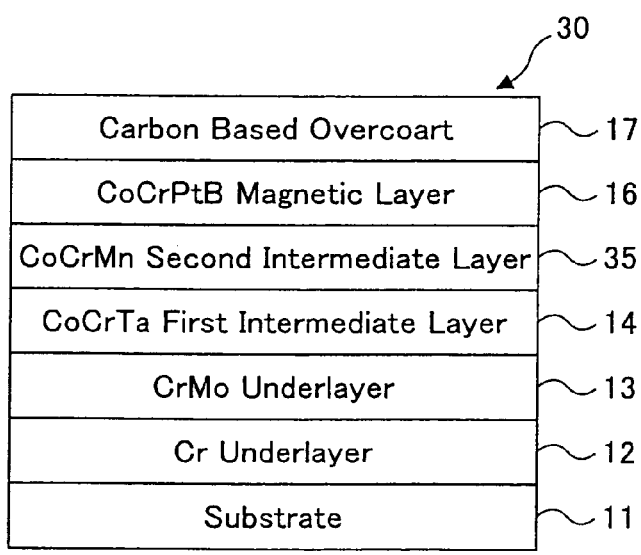
FIG. 16 is a schematic illustration of the lamination structure of magnetic recording medium according to the second embodiment of the present invention.

FIG. 16 is a schematic illustration of the lamination structure of a magnetic recording medium 30 according to the second embodiment. The magnetic recording medium 30 includes an Al substrate 11 coated with an electroless plated NiP film, its surface being textured by texture processing. The magnetic recording medium 30 further includes a Cr underlayer 12, a CrMo underlayer 13, a CoCrTa first intermediate layer 14, a CoCrMn second intermediate layer 35, a CoCrPtB magnetic layer 16, and a carbon-based overcoat 17, all laminated on the substrate 11 in that order.

The magnetic recording medium 30 according to this embodiment is manufactured by laminating each layer in order using the sputtering method. Before laminating the Cr underlayer 12, for example, the air in the sputtering chamber is exhausted below $1.0 \times 10^{-5}$ Pa, and the substrate 11 is heated up to about 210° C. After the heating, Ar gas is injected to maintain the pressure in the sputtering chamber at about 0.67 Pa. Then, the Cr underlayer (5 nm), the CrMo underlayer (2 nm), the CoCrTa intermediate layer (2 nm), the CoCrMn intermediate layer (2 nm), the CoCrPtB magnetic layer (15 nm), and the carbon-based protective layer (5 nm) are formed in that order on the nonmagnetic NiP—Al substrate.

Figure 17:
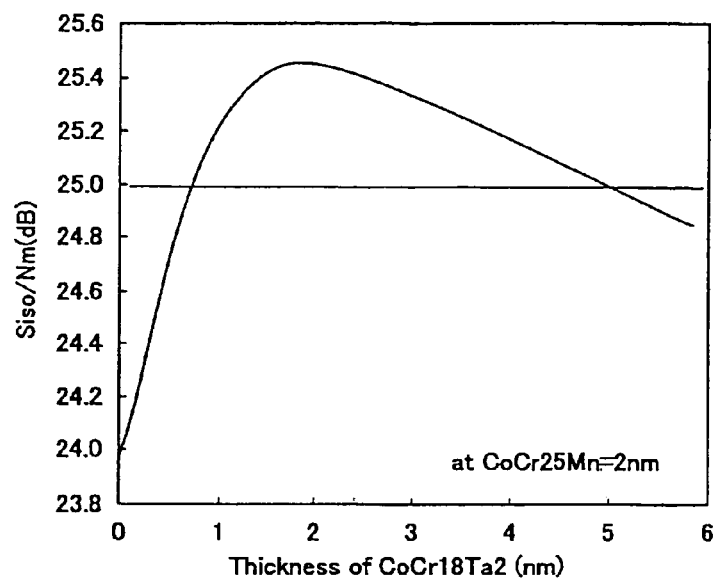
FIG. 17 is a graph of the isolated pulse signal to media noise ratio Siso/Nm, as a function of the first intermediate layer thickness of the magnetic recording medium according to the second embodiment.

FIG. 17 shows the dependency of isolated pulse signal to media noise ratio (Siso/Nm) on the thickness of the first intermediate layer 14, which is made of $CoCr_{18}Ta_2$, in the case wherein the second intermediate layer 35 is a 2 nm thick $CoCr_{25}Mn_5$ layer. FIG. 17 shows that, when the CoCrTa first intermediate layer 14 is 1-5 nm thick, Siso/Nm exceeds 25 dB, which is preferable.

In FIG. 17, if the thickness of $CoCr_{18}Ta_2$ is zero, that is, the first intermediate layer 14 does not exist, Siso/Nm is considerably reduced. In this case, the structure is the same as the conventional one in which only the second intermediate layer 35 is formed.

Figure 18:
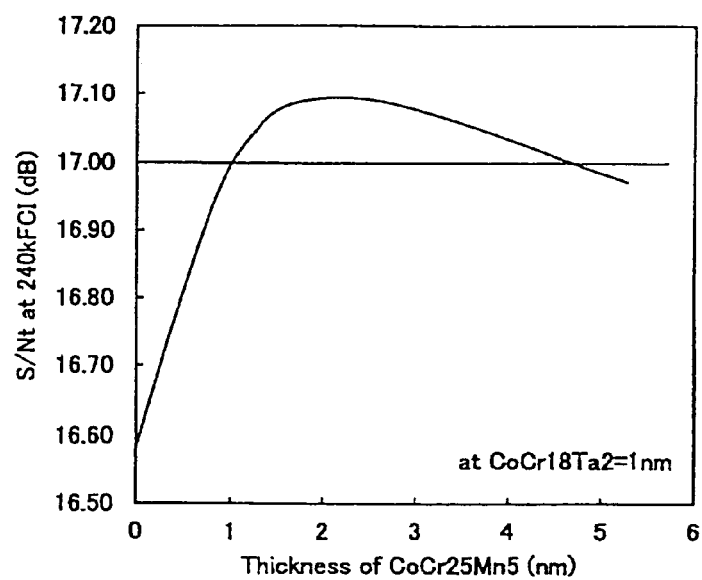
FIG. 18 is a graph of the total S/N as a function of the second intermediate layer thickness of the magnetic recording medium.

FIG. 18 shows, in contrast to FIG. 17, the dependency of signal to total noise ratio (S/Nt) on the thickness of the $CoCr_{25}Mn_5$ second intermediate layer, in the case such that the thickness of the $CoCr_{18}Ta_2$ first intermediate layer 14 is fixed at 1 nm. FIG. 18 shows, when the $CoCr_{25}Mn_5$ second intermediate layer 35 is 1-5 nm thick, S/Nt is improved and becomes 17.0 dB or more, which is desirable.

In addition, if the thickness of the $CoCr_{25}Mn_5$ second intermediate layer is zero, that is, there is no second intermediate layer, S/Nt is lowered considerably. In this case, only the first intermediate layer is provided in the magnetic recording medium.

Figure 19:
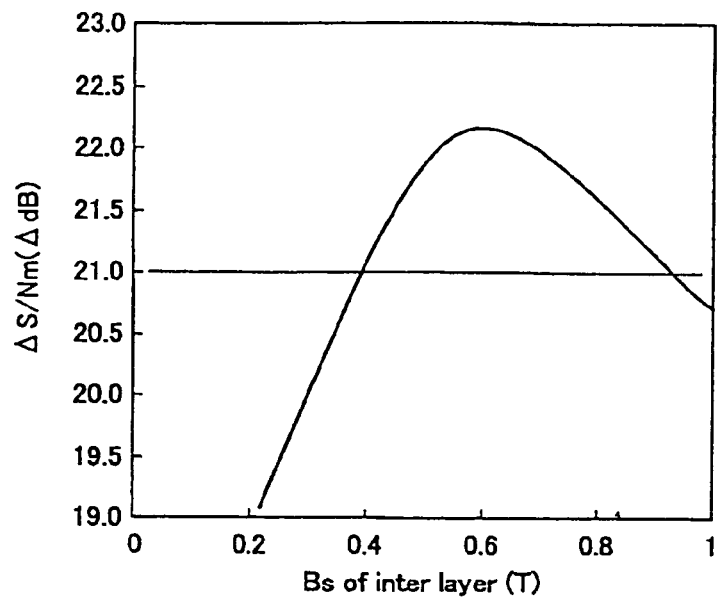
FIG. 19 is a graph of the ratio S/Nm of a reproduction signal to media noise, as a function of the saturation magnetic flux density Bs, of the magnetic recording medium according to the second embodiment.

FIG. 19 shows the relationship between signal to media noise ratio S/Nm and saturation magnetic flux density Bs of the first intermediate layer 14, in the case wherein the composition of the first intermediate layer 14 according to this embodiment is changed and a signal of 200 kFCI is recorded/reproduced. The relationship showed in FIG. 19 is substantially identical to that showed in FIG. 9 in the case of the first embodiment. In addition, in this embodiment, the saturation magnetic flux density Bs of each intermediate layer was measured by a VSM method at room temperature using a sample comprising a 15 nm thick layer of each intermediate layer material on a Cr underlayer. One can be sure that, when the saturation magnetic flux density Bs of the material forming the first intermediate layer 14 is 0.6 T, the S/Nm hits the maximum value. Since S/Nm of 21 dB or more is desired, the saturation magnetic flux density Bs of the magnetic material forming the first intermediate layer 14 is preferred to be 0.4-0.9 T.

Figure 20:
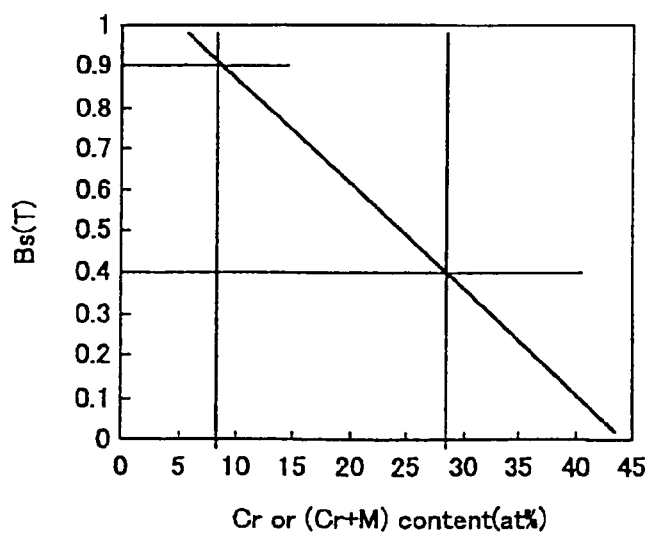
FIG. 20 is a graph showing the relationship between the Cr or Cr+M density and the saturation magnetic flux density Bs.

For example, one can be sure by reference to FIG. 20 that, in the case such that a Co—Cr dual alloy is used for the first intermediate layer 14, Bs falls within the range of 0.4-0.9 T when the Cr density is 7-28 at %. FIG. 20 is substantially identical to FIG. 10 according to the first embodiment.

As described above, intermediate layers formed above the first intermediate layer 14 weaken the ferromagnetic interaction (exchange interaction) between the first intermediate layer 14 and the magnetic layer. That is the reason why Bs of the material of the intermediate layers above the first intermediate layer is preferred to be lower than Bs of the first intermediate layer. When Bs of the material of the intermediate layers above the first is 0-0.4 T, the magnetic recording medium has preferable in-plane orientation, high magnetocrystalline anisotropy field Hk, high thermal stability, and high signal to media noise.

By the way, the second intermediate layer 35 according to this embodiment further contains element M (Mn, Re, Mo). The present inventors have confirmed that Bs of the second intermediate layer 35 depends on (Y+Z) wherein "Y" (at %) means the density of Cr and "Z" (at %) means the density of "M".

Therefore, by reference to FIG. 20, one may know that, if the preferable range of Bs is 0-0.4 T, the density of (Cr+Mn) is required to be about 29-45 at %. The present inventors further confirmed that, when Mn is replaced with Mo or Re, a similar effect is obtained.

Additionally, in order to reduce the misfit between the crystalline structure of the magnetic layer containing Pt at a relatively high density ($6 \leq Pt \leq 20$ at %) and the crystalline structure of the Cr underlayer, it is desirable that the Cr-based underlayer contains at least one of molybdenum, tantalum, titanium, tungsten, and vanadium, by 1 at % or more. One can thereby improve the in-plane orientation of the magnetic recording medium.

Furthermore, when two underlayers are formed on a textured substrate, the bottom one being made of Cr and the top one being made of CrMo, one can improve the orientation ratio (O.R.) as well as the in-plane orientation.

The dependency of O.R. on the total thickness of all the underlayers of the magnetic recording medium 30 according to this embodiment is substantially identical to that of the magnetic recording medium 10 according to the first embodiment, in which two underlayers are formed, showed in FIG. 15.

The third embodiment of the present invention will now be described.

The magnetic recording medium relative to the third embodiment includes at least one underlayer made of Cr or a Cr-based alloy on a non-magnetic substrate made of glass or aluminum, for example. It is desired that the magnetic recording medium relative to the second embodiment also includes an intermediate layer made of a Co-based alloy on the underlayer(s). A magnetic layer including Ag is included on the intermediate layer, if any.

The magnetic recording medium is made of a CoCrPt-BAg-based alloy, for example, and a composition ratio of $Co_{(100-a-b-c-d)}Cr_aPt_bB_cAg_d$ ($21 \leq a+c \leq 30$ at %, $6 \leq b \leq 20$ at %, $1 \leq d \leq 9$ at %) is preferable.

Furthermore, the magnetic layer of this embodiment can be made of different magnetic materials, or can include at least two magnetic layers as a complex magnetic layer made of a combination of a CoCrPtB-based alloy and a CoCrPtAg-based alloy, for example.

It is desired that the underlayer be made of a Cr-based alloy including as an ingredient at least one of W, V, or Mo, and have a crystal structure of a body-centered cubic structure (bcc structure).

It is further desirable that the intermediate layer be made of a Co-based alloy including as an ingredient at least one of Cr, Ta, Mo, Mn, Re, and Ru, and have a crystal structure of a hexagonal close-packed structure (hcp structure). The intermediate layer is desired to be 0.5-3.0 nm thick.

The magnetic recording medium relative to the third embodiment realizes both low noise and improved magnetocrystalline anisotropy field.

Figure 21:
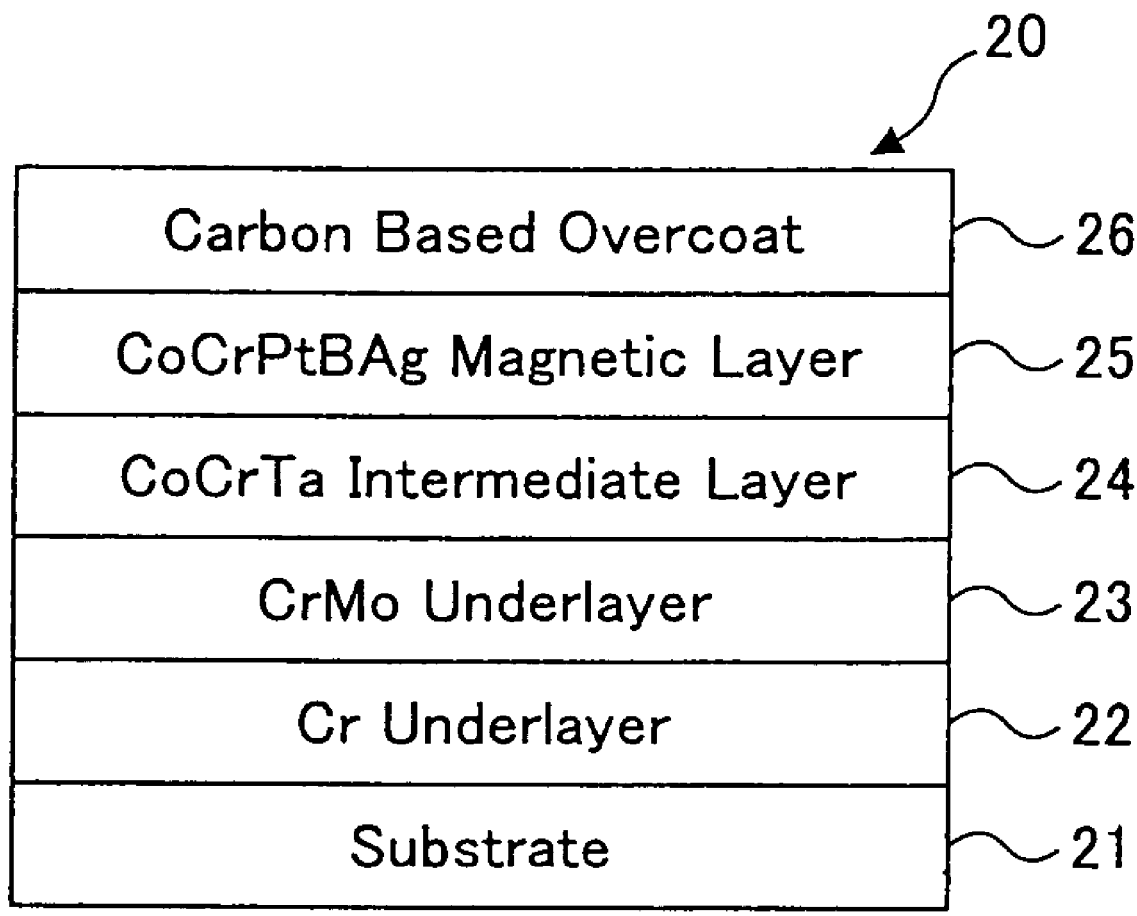
FIG. 21 is a schematic illustration of the lamination structure of a magnetic recording medium according to the third embodiment of the present invention.

FIG. 21 is a schematic diagram of the lamination structure of a magnetic recording medium 20 relative to the third embodiment.

A substrate 21 is an aluminum substrate, coated by electroless plating of a NiP film, of which surface is treated mechanically or by laser texture along concentric circles.

The magnetic recording medium 20 of this embodiment can be manufactured through a thin film formation technique using sputtering equipment. More particularly, the DC magnetron sputtering technique is used in this embodiment. The air in a sputtering chamber is exhausted below $4.0 \times 10^{-5}$ Pa and Ar gas is injected into the sputtering chamber up to 0.67 Pa.

The substrate 11 is heated up to above 200° C. before forming a thin film in order to clean up the surface of the substrate 11, control a crystal orientation, and reduce intergranular interaction in the magnetic layer 25. It is preferable to control the temperature of the substrate between 200 and 270° C. because a NiP may crystallize at a substrate temperature over 270° C. In this embodiment, the temperature of the substrate 11 is, before forming the thin film, set at 220° C.

A Cr-based alloy having a larger lattice constant than does pure Cr is used to form an underlayer. Accordingly, a good in-plane orientation is obtained because of improved spacing matching between the magnetic layer 25 and the Cr-based alloy underlayer 23. In this embodiment, a 5 nm-thick Cr layer is formed as the first underlayer 22 and a 2 nm-thick CrMo-based alloy layer is formed as the second underlayer 23.

It is desired that the intermediate layer 24 be made of a Co-based alloy having an hcp structure. The Co-based alloy improves an in-plane crystal orientation of the magnetic layer 25. As the thickness of the intermediate layer 24 increases, the resolution of the magnetic recording medium decreases. Preferred range of the thickness is 0.5-3.0 nm. In this embodiment, the intermediate layer 24 is a 1 nm-thick CoCrTa-based alloy.

The magnetic layer 25 includes at least one layer made of a CoCrPtBAg-based alloy. In this embodiment, the magnetic layer 25 is made of $Co_{(100-x)}Cr_{22}Pt_{10}B_4Ag_x$ (x=1–11).

A coercive force Hc increases as the product tBr of a thickness t and a remanent magnetic flux density Br of the magnetic layer 25 increases, but too large a tBr results in a drop in a record/reproduction resolution and the coercive force Hc. A preferable range of tBr of the magnetic layer 25 is 2.0-10.0 nTm. In this embodiment, tBr of the magnetic layer is set at 6.0 nTm.

An overcoat 26 formed on the magnetic layer 25 is mainly made of carbon (C). The overcoat 26 of this embodiment is a 6 nm-thick carbon film.

Figure 22:
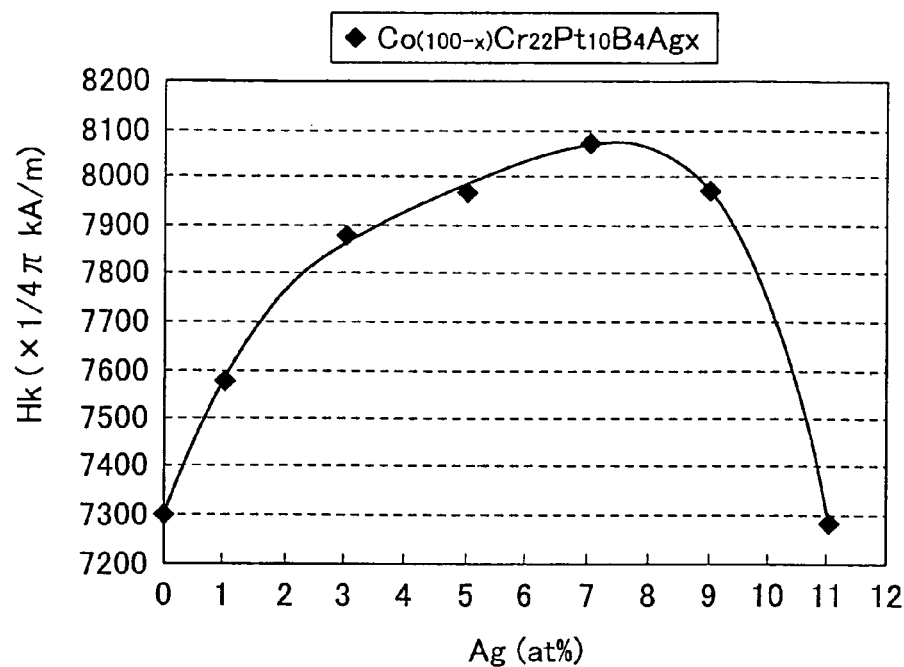
FIG. 22 is a graph of an magnetocrystalline anisotropy field Hk measured by the torque-loss method at room temperature, as a function of Ag density in the magnetic layer.

FIG. 22 is a graph of an magnetocrystalline anisotropy field Hk measured by the torque-loss method at room temperature as a function of Ag density of the magnetic layer 25 having a composition of $Co_{(100-x)}Cr_{22}Pt_{10}B_4Ag_x$ (x=1–11). FIG. 22 shows the dependency of the magnetocrystalline anisotropy field Hk on the Ag density of the magnetic layer 25.

In case of the magnetic layer 25 of the magnetic recording medium 20 of this embodiment, even though the sum of a Cr density and a B density is 28 at % where media noise is low enough, the magnetocrystalline anisotropy field Hk is improved.

Figure 23:
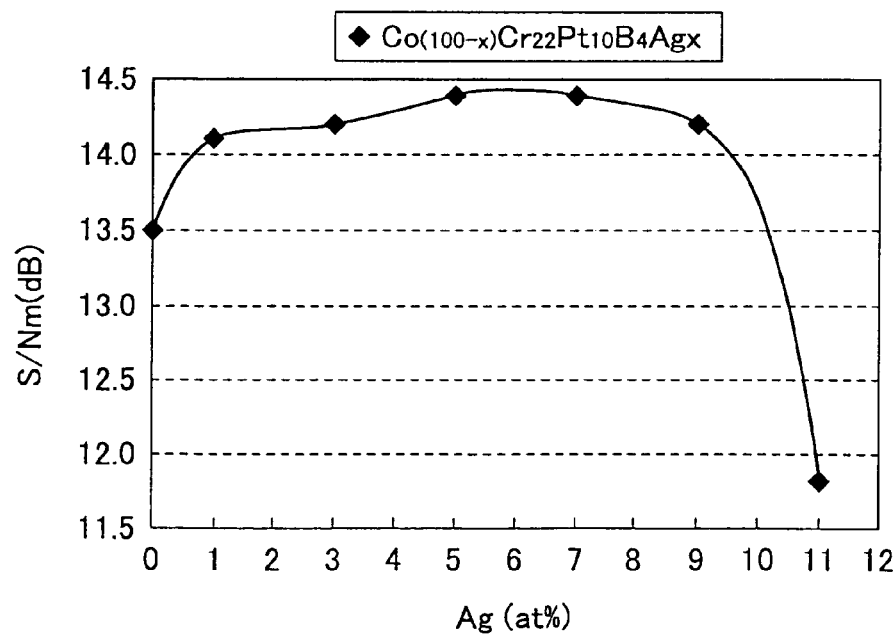
FIG. 23 is a graph of a reproduction signal-to-media noise ratio (S/Nm) at a recording density 351 kFCI, as a function of Ag density in the magnetic layer.

FIG. 23 is a graph of the ratio (S/Nm) of a readout signal of a recording density 351 kFCI to media noise of the magnetic layer 25 having a composition of $Co_{(100-x)}Cr_{22}Pt_{10}B_4Ag_x$ (x=1–11) as a function of Ag density. FIG. 23 shows a dependency of the. S/Nm on the Ag density of the magnetic layer 25. The magnetic layer 25 of the magnetic recording medium 20 of this embodiment exhibits the properties of lower noise and higher S/Nm than a conventional magnetic layer made of a CoCrPtB-based alloy.

Figure 24:
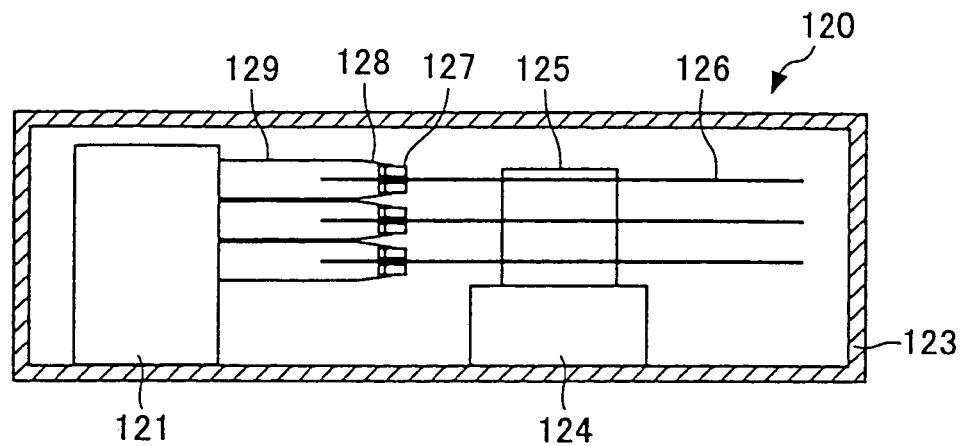
FIG. 24 is a schematic sectional view of a hard disk drive according to an embodiment of the present invention.

A description of a magnetic recording device as an embodiment of the present invention will now be given with reference to FIGS. 18 and 19. FIG. 24 is a sectional view showing the main part of a magnetic recording device 120 as an embodiment of the present invention, and FIG. 25 is a plan view showing the main part of the magnetic recording device 120.

Figure 25:
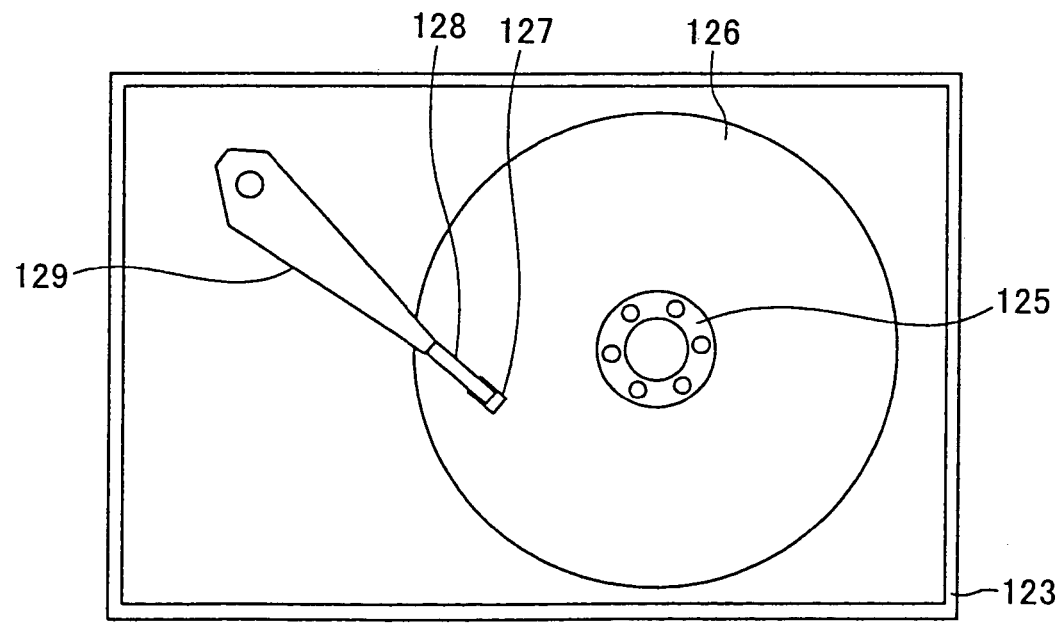
FIG. 25 is a plan view of the hard disk drive according to an embodiment of the present invention.

As shown in FIG. 24 and FIG. 25, the magnetic recording device is covered by a housing 123. The magnetic recording device 120 includes, in the housing 123, a motor 124, a hub 125, a plurality of magnetic recording media 126, a plurality of recording/reproduction heads 127, a plurality of suspensions 128, a plurality of arms 129, and an actuator unit 121. The magnetic recording media 126 are fixed to the hub 125 rotated by the motor 124. Each recording/reproduction head 127 is a combination type recording/reproduction head of a reproduction head such as an MR Head and a GMR Head, and a recording head such as an inductive head. Each recording/reproduction head 127 is mounted on the point of a corresponding arm 129 through a suspension 128. The arm 129 is driven by the actuator unit 121. A detailed description of the configuration of this magnetic recording device is omitted because the essential structure of this magnetic recording device is publicly known.

The above embodiment of the magnetic recording device 120 is characterized by the magnetic recording medium 126. Each magnetic recording medium 126 is structured as showed in FIGS. 2, 16, or 21. The quantity of the magnetic recording media 126 is not limited to three, and can be one, two, or more than three. The configuration of the magnetic recording device 120 is not limited to those showed in FIGS. 24 and 25. The application of the magnetic recording medium 126 is not limited to hard disks.

The present invention is not limited to these embodiments, but various variations and modifications may be made without departing from the scope of the present invention.

This patent application is based on Japanese priority patent applications No. 2001-198538 and No. 2002-121273 filed on Jun. 29, 2001, and Apr. 23, 2002, respectively, the entire contents of which are hereby incorporated by reference.

What is claimed is:

1. A magnetic recording medium, comprising:
a substrate;
an underlayer on said substrate; and
a magnetic layer on said underlayer,
wherein
said magnetic layer is made of an alloy including cobalt, chromium, platinum, boron, and silver substantially at a ratio of $Co_{(100-a-b-c-d)}Cr_aPt_bB_cAg_d$ ($21 \leq a+c \leq 30$ at %, $6 \leq b \leq 20$ at %, $1 \leq d \leq 9$ at %),
wherein the product of a thickness of said magnetic layer and a remanent magnetic flux density of said magnetic layer is substantially between 2.0 and 10.0 nTm.

2. The magnetic recording medium claimed in claim 1, wherein said magnetic layer further comprises both a first magnetic sub-layer and a second magnetic sub-layer,
the first magnetic sub-layer is made of an alloy including cobalt, chromium, platinum, and boron, and
the second magnetic sub-layer made of an alloy including cobalt, chromium, platinum, boron and silver.

3. The magnetic recording medium claimed in claim 1, further comprising an intermediate layer made of a cobalt based alloy between said underlayer and said magnetic layer.

* * * * *